United States Patent [19]

Barahia

[11] Patent Number: 4,879,483
[45] Date of Patent: Nov. 7, 1989

[54] MOLDED MULTI-PART GENERATOR FAN

[75] Inventor: Manoj M. Barahia, Manchester, Mo.

[73] Assignee: Century Electric, Inc., St. Louis, Mo.

[21] Appl. No.: 201,886

[22] Filed: Jun. 3, 1988

[51] Int. Cl.⁴ .......................... H02K 9/06; F04D 29/28
[52] U.S. Cl. .......................................... 310/63; 310/43;
416/179; 416/185
[58] Field of Search .................. 29/156.8 LF; 310/43,
310/62, 63, 67, 68 D; 416/179, 185, 187

[56] References Cited
U.S. PATENT DOCUMENTS

| | | | |
|---|---|---|---|
| 3,521,973 | 7/1970 | Schouw | 29/156.8 CF |
| 3,608,172 | 9/1971 | Lindquist | 29/156.8 CF |
| 4,428,717 | 1/1984 | Catterfield | 29/156.8 CF |
| 4,588,915 | 5/1986 | Gold et al. | 310/43 |

Primary Examiner—Patrick R. Salce
Assistant Examiner—D. L. Rebsch
Attorney, Agent, or Firm—Rogers, Howell & Haferkamp

[57] ABSTRACT

A multi-part molded plastic annular fan is formed from four pieces, each piece having upstanding fan blades and a number of integrally molded cylindrical metal sleeves through which bolts extend to mount the fan parts to a flywheel of an engine drive train. Each fan part has an interlocking member at both ends thereof which secure the fan parts together, and a bolt extends through the interlocking members to secure the fan parts to the flywheel.

20 Claims, 2 Drawing Sheets

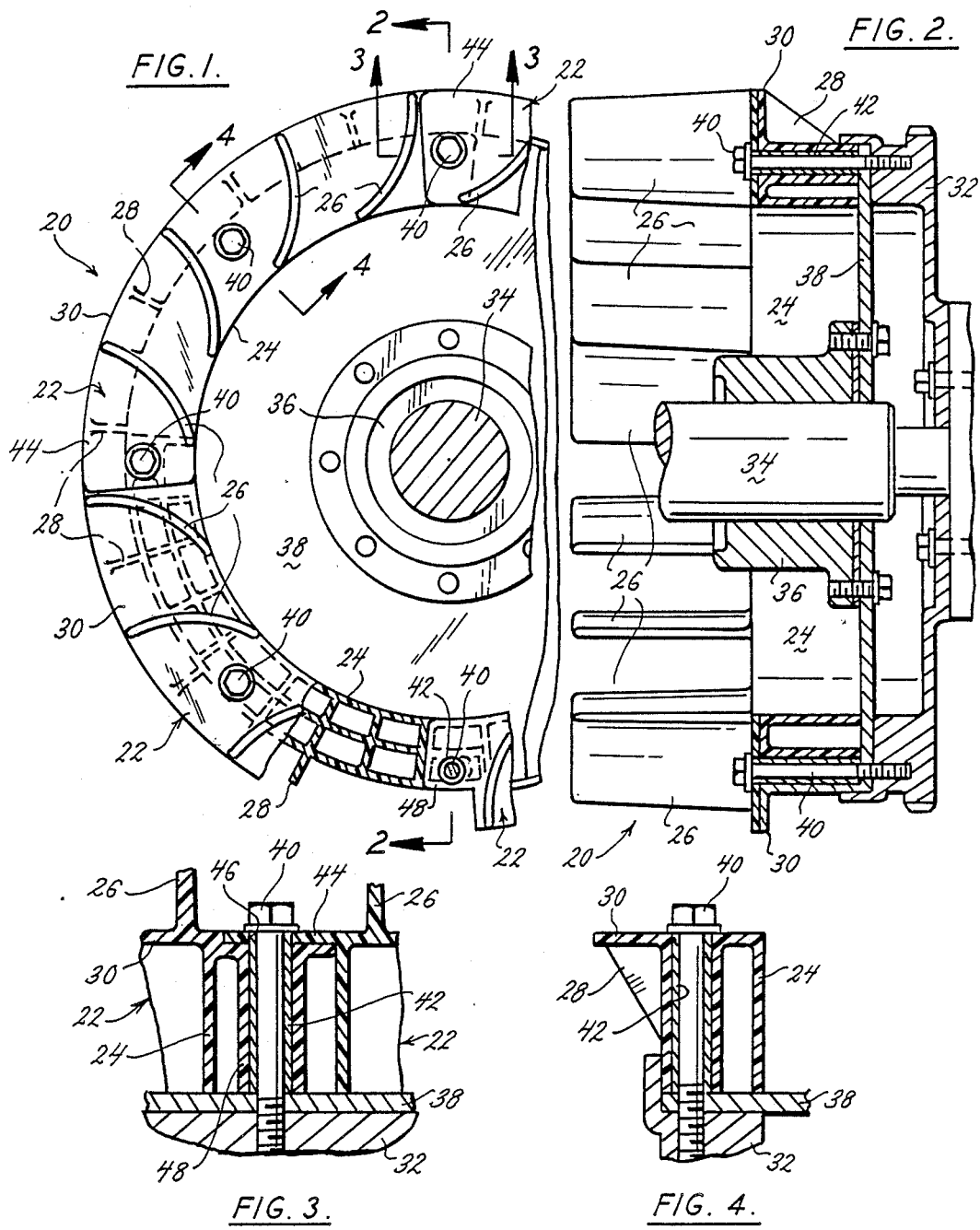

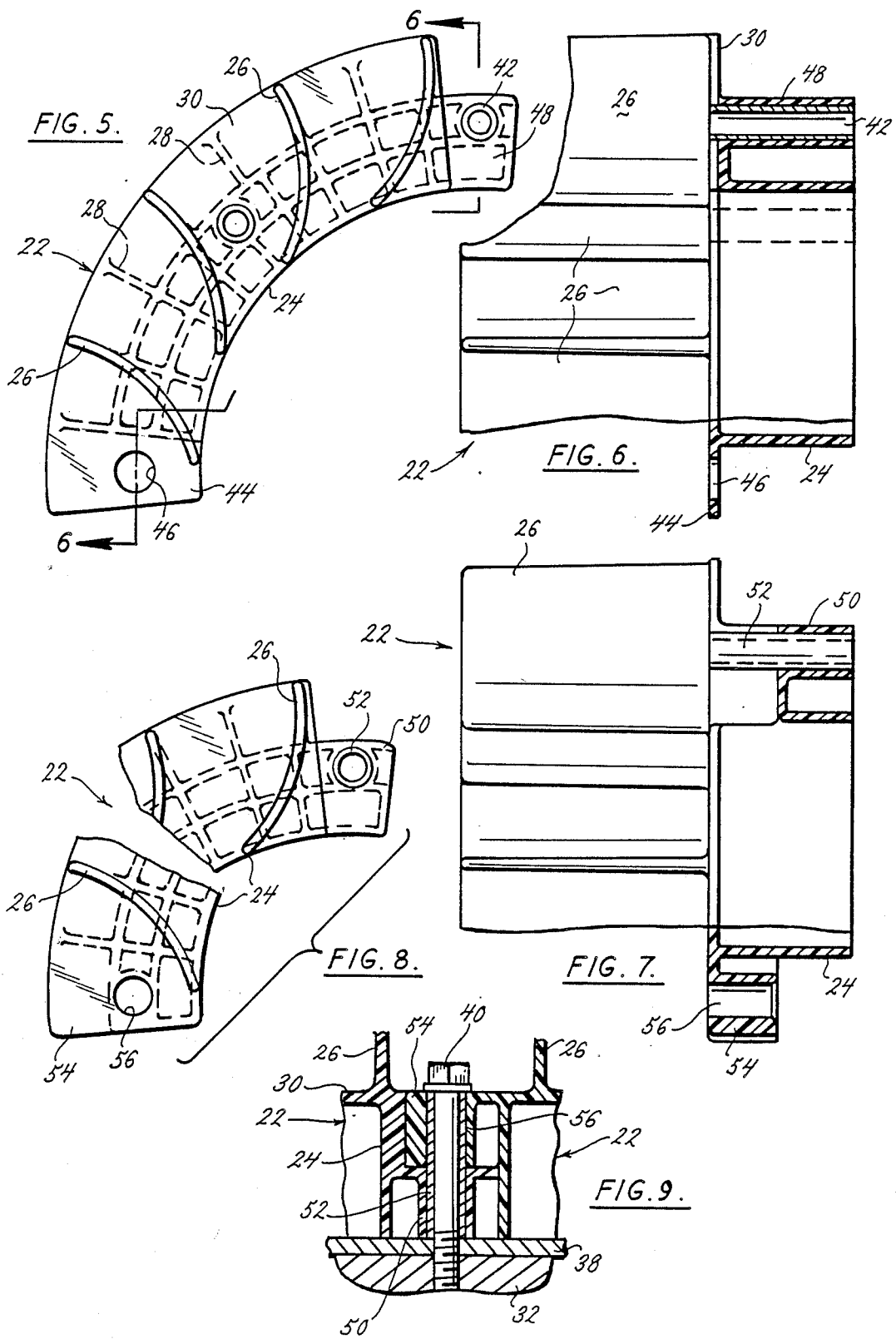

MOLDED MULTI-PART GENERATOR FAN

BACKGROUND AND SUMMARY OF THE INVENTION

A typical heavy-duty electrical generator design such as would be used on an industrial engine as the prime mover for construction equipment or the like generally includes a significant amount of iron and copper in the core and windings thereof. This concentration of material generates a significant amount of heat in operation and requires cooling to perform efficiently. Typically, a steel or aluminum fabricated, cast gray iron or aluminum cast annular exhaust fan is secured to the coupling between the engine flywheel and the generator drive shaft, and includes a plurality of paddle blades which push air through the generator windings and core to cool them as the flywheel and drive shaft rotate. Because of the significant forces created in the engine, a flexible connection of some sort is generally used to minimize the transmission of vibration and other such disruptive forces between it and the generator. Also because of these vibrational forces, and the significant torsional forces experienced not only from the overall speed of the engine, but also the torsional vibration of the engine experienced during normal operation, it has generally been thought that a very high strength metal must be utilized to ensure a long and reliable operational life for these exhaust fans which may typically be 24 inches in diameter. Of course, with fabricated and cast metal fans, balancing the fan is a critical step which must be attended to to ensure proper operation. Furthermore, if one of the fan blades would break, the entire fan would be out of balance and would have to be replaced, even though a significant portion of the fan remained intact. Of course, with diameters approaching 24 inches, or even larger, shipment of a replacement fan is not an easy task and generally requires that the fan be mounted to a wooden pallet or the like to prevent its breakage and to properly support it during shipping and before installation.

To solve these and other problems of the prior art, and to significantly reduce the cost of the fan and its repair, the inventor herein has succeeded in designing and developing a multi-part molded plastic fan for use in place of the one-piece metal cast fan of the prior art. The present invention consists of a 90° annular segment which is plastic molded with two metallic sleeve inserts for mounting of the segment to the flywheel of the engine. At either end of each segment is an interlocking structure which takes a different form in each of two embodiments. In a first embodiment, one end is a flange-like member with a hole formed therein and the other end is a platform member with one of the metallic sleeves molded therein such that a flange of one segment overlies a platform of an adjacent segment with the hole in the flange fitting over the upstanding portion of the metallic sleeve, the sleeve extending substantially the entire height of the base of the segment. A bolt is then passed through the hole in the flange and the metallic sleeve and has a threaded end which secures the flange, the platform, and the flex plate coupling to the flywheel. With this interlocking structure, a bolt is used to secure each fan segment at its point of juncture to the flywheel. This is important as the fans are generally tested at greater than their normal operating speed for several hours at maximum operating temperature to ensure their long life in the field. This interlocking structure has been found sufficient to pass this test.

In another embodiment, the inventor has modified the interlocking structure by utilizing a half-height base member at one end of the segment, and a half-height base member at the other end of the segment, the half-height base members being arranged so that they overlie one another, with the same metal cylindrical sleeve being molded into one of the half-height base members and the other having a hole therein so that it may be fitted over the sleeve and mounted by a single bolt to the flywheel as with the first embodiment. This second embodiment is thought to be an improvement over the first embodiment in that it eliminates the somewhat thinner flange portion of the interlock and instead utilizes half-height base members which are thought to be less susceptible to cracking during operation.

With either embodiment, the interlocking structure at each end of each segment may be utilized to pre-assemble the fan prior to its assembly to the generator. In this regard, the metal cylindrical sleeves which are molded into the segments may be used to match and line up the segments and facilitate its pre-assembly prior to installation. Alternately, the fan segments may be individually mounted one at a time to the generator. This approach has the advantage of permitting the installer to handle smaller pieces of the fan and support it as it is being installed. Although it is generally believed that pre-assembly of the segments into a fan results in easier installation in the majority of designs, either approach may be utilized depending upon the particular design and preference of the installer.

The inventor has found that 20% to 40% glass-filled nylon plastic is suitable for use in molding the segments used to form the multi-piece annular fan of his invention. Alternately, carbon fiber filled plastic may be used to give greater strength. If made from carbon filled plastic, it is believed that the metal cylindrical sleeves may be eliminated. Other plastics exhibiting similar characteristics could be utilized as well. As mentioned above the use of plastic significantly reduces the cost of the fan for several reasons. These include the basic material cost used to initially manufacture the fan, the elimination of the balancing and machining steps, the significant reduction in the tooling cost due to the smaller piece size, and the significant savings not only in shipping the smaller plastic segments, but also the reduction in repair costs made possible by the ability to replace only that portion of the annular fan which has failed.

The foregoing has been a brief summary of some of the principal advantages and features of the invention. A more detailed understanding of the invention may be obtained by referring to the drawings and description of the preferred embodiment which follow.

BRIEF DESCRIPTION OF THE DRAWINGS

FIG. 1 is a partial front view of an assembled multi-piece fan of the present invention as mounted to a flywheel;

FIG. 2 is a cross-sectional view taken along the plane of line 2—2 in FIG. 1 detailing the mounting of the fan to the flywheel;

FIG. 3 is a cross-sectional view taken along the plane of line 3—3 in FIG. 1 detailing the construction of the interlocking members;

FIG. 4 is a cross-sectional view taken along the plane of line 4—4 in FIG. 1 detailing the mounting of the fan segment to the flywheel;

FIG. 5 is a top view of a single segment of the multi-piece fan;

FIG. 6 is a partial staggered cross-sectional view taken along the plane of line 6—6 in FIG. 5 further detailing the interlocking portions of the first embodiment;

FIG. 7 is a partial staggered cross-sectional view similar to FIG. 6 except detailing the interlocking members of the second embodiment;

FIG. 8 is a segmented top view of the two ends of the segment comprising the second embodiment; and FIG. 9 is a cross-sectional view detailing the mounting of the interlocking members of the second embodiment.

DETAILED DESCRIPTION OF THE PREFERRED EMBODIMENT

As shown in FIGS. 1 and 2, the multi-piece fan 20 of the present invention is comprises four segments 22, each segment 22 being a one-piece molded member having an arcuate base member 24 and a plurality of upstanding fan blades 26. The fan blades 26 have a generally arcuate shape themselves to scoop the air and propel it through the windings of the generator, as is known in the art. Each fan part 22 has a number of ribs 28 which extend between the base member 24 and the base platform 30 which supports the fan blades 26.

As best shown in FIGS. 2 and 4, the engine flywheel 32 is coupled to the generator drive shaft 34 and drive hub 36 by a generally annularly shaped flex plate 38. This helps reduce the transmission of vibrational forces between the flywheel 32 and shaft 34, as known in the art. The fan parts 22 are secured to the flywheel 32 by a plurality of bolts 40, each of which extends through a generally cylindrical metal sleeve 42 molded into the base member 24 of the fan parts 22. Each fan part 22 has two of the cylindrical metal sleeves 42.

As best shown in FIGS. 3, 5, and 6, each fan part 22 of the first embodiment has a flange 44 with a hole 46 therein, hole 46 being sized to slip over the top and surround the metallic sleeve 42 which is molded into a platform member 48 in an adjacent fan part 22. Thus, as bolt 40 is slipped through sleeve 42 it not only secures adjacent fan parts 22 together, but also mounts them to flywheel 32 and flex plate 38. This interlocking structure greatly increases the strength with which the fan parts 22 are held in place, not only with respect to each other but also with respect to the overall assembly. This is important in maintaining the structural integrity of the fan 20 as vibrational forces and torsional forces are introduced therein during operation of the engine and generator.

As shown in FIGS. 7-9, the fan part 22 may have a different interlocking structure to secure the fan parts 22 together and to the flywheel 32. As shown therein, a half-height base member 50 at one end of fan part 22 has an integrally molded cylindrical metal sleeve 52 which extends substantially the same height as the base portion 24. At the other end of fan part 22 is another half-height interlocking member 54 with a hole 56 therethrough. As best shown in FIG. 9, these half-height interlocking members 50, 54 are assembled by inserting cylindrical sleeve 52 through the hole 56 in interlocking member 54, and then inserting threaded bolt 40 therethrough. This second embodiment is believed to provide somewhat more reliable mounting of the fan parts 22, in that flange 44 of the first embodiment is eliminated and instead a half-height interlocking member 54 is utilized which is thought to be less susceptible to cracking during use.

With either embodiment, the fan parts 22 may be pre-assembled prior to their being secured to the flywheel 32 by bolts 40. In the first embodiment, the cylindrical metal sleeve 42 of each fan segment may be interfitted with the hole 46 in flange 44 to pre-assemble the four fan parts 22 comprising the multi-piece fan 20. In the second embodiment, cylindrical metal sleeve 52 may be interfitted with the hole 56 in half-height interlocking member 54 to pre-assemble the four fan parts 22 into a fan 20. By pre-assembly, careful alignment and interfitting of the various fan parts 22 together may be achieved without the problem of slight misalignments caused by individually securing the fan parts 22 with bolts 40. However, an installer may have a particular preference with regard to particular designs such that either assembling the fan parts 22 individually or as a pre-assembled fan 20 may be used, as desired.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. In a rotating dynamo electric machine, said dynamo electric machine having a driven member secured to a driving member of said machine, said driven and driving members comprising a drive train, the improvement comprising a plastic annular fan attached to the drive train said fan including a plurality of overlying interlocking sectoral fan parts, and said fan having means to cool the machine as the drive train rotates.

2. The device of claim 1 further comprising means to interlock adjacent parts of said multi-part fan.

3. The device of claim 2 wherein each fan part includes a generally arcuate base member with a plurality of fan blades extending outwardly therefrom, said interlock means comprising a flange at one end of the base member and a matching platform at the other end of the base member so that the flange of one fan part overlies the platform of the adjacent fan part.

4. The device of claim 3 further comprising a plurality of cylindrical sleeves extensions in the base member and extending substantially the height thereof, one of said sleeves being positioned in the platform and each of said flanges having an opening therein for insertion of the sleeve in the interlocking flange.

5. The device of claim 4 wherein said sleeve extensions are metal inserts.

6. The device of claim 4 wherein a plurality of bolts extend through the sleeves to attach the fan parts together and to the drive train.

7. The device of claim 6 further comprising a flexible connection between the driving member and the driven member, said plurality of bolts attaching said flexible connection to the driving member.

8. The device of claim 7 wherein the rotating dynamo electric machine is a generator for use with an industrial engine.

9. The device of claim 1 wherein the plastic fan parts are molded with glass filled nylon plastic.

10. The device of claim 1 wherein the fan parts are molded with carbon fiber filled plastic.

11. The device of claim 1 wherein the annular fan comprises four fan parts, each fan part subtending approximately 90° thereof when assembled.

12. The device of claim 2 wherein each fan part includes a generally arcuate base member with a plurality of fan blades extending outwardly therefrom, said interlock means comprising an interlock member at each end of the base member, said interlock members having means to overlap as adjacent fan parts are attached.

13. The device of claim 12 further comprising means to secure overlapping interlocking members together and to the drive train.

14. The device of claim 13 further comprising a cylindrical metal sleeve molded in one of the interlocking members of each fan part, the other interlocking members having a hole positioned therein to match and line up with said sleeve.

15. The device of claim 14 wherein the sleeve is substantially the same height as the base member, and the overlapping members are together substantially the same height as the base member.

16. The device of claim 15 wherein the annular fan comprises four fan parts, each fan part being molded of plastic and subtending approximately 90° thereof when assembled.

17. In a generator for use with an industrial engine, said generator having a driven member secured to a driving member of said engine, said driving and driven members comprising a drive train, the improvement comprising a plastic multi-part sectoral annular fan for attachment to the drive train, each fan part having an interlocking member at each side thereof, said interlocking members of adjacent fan parts having means to interlock so as to join the fan parts together without their attachment to the drive train, and means for extending through said interlocking members to secure them together and to the drive train.

18. The device of claim 17 wherein the interlocking means includes a cylindrical sleeve molded into one of the interlocking members of each fan part, the other interlocking members having means defining a hole therein for receiving the sleeve.

19. The device of claim 18 wherein each fan part has a generally arcuate base member subtending approximately 90° of the fan, each interlocking member having a height approximately half of the base member height, the interlocking members of each fan part being offset so that as the fan parts are joined, the interlocking members overlap and form an assembly substantially the same height as the base member.

20. In a generator for use with an industrial engine, said generator having a driven member, said engine having a driving member, and a generally flexible connection between said driven and driving members, the improvement comprising a molded plastic multi-part annular fan for attachment to the driving member and flexible connection, each fan part having an interlocking member at each side thereof, one of said interlocking members for each fan part having a cylindrical sleeve molded therein and the other of said interlocking members having means defining a hole therein for receiving the cylindrical sleeve of the adjacent fan part as the fan parts are joined, and means for extending through said cylindrical sleeves to attach said fan parts together and to said driving member.

* * * * *